G. FACCIOLI.
VARIABLE FREQUENCY GENERATOR.
APPLICATION FILED MAY 7, 1908.
949,320.
Patented Feb. 15, 1910.
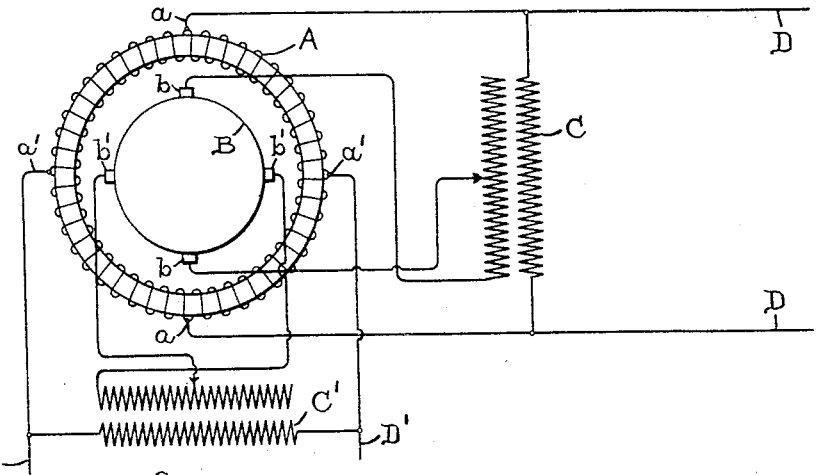
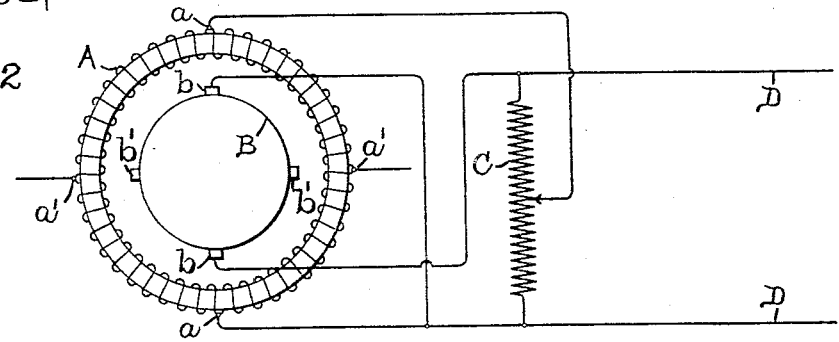
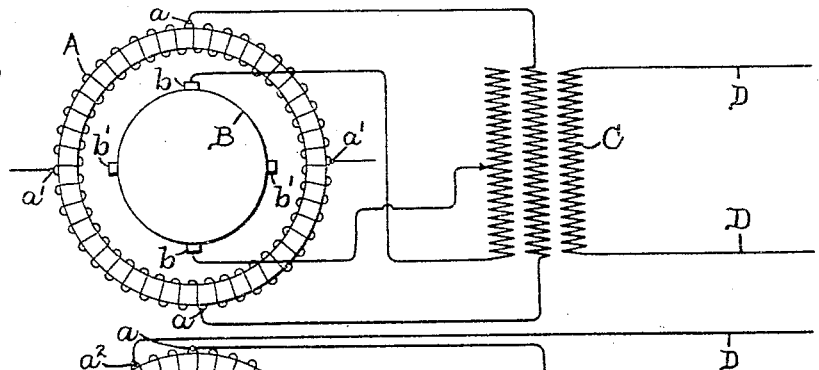
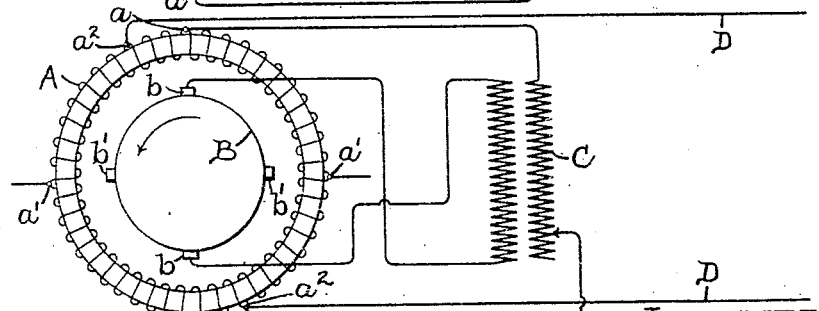
WITNESSES:
INVENTOR
GIUSEPPE FACCIOLI.
BY
ATTY.

UNITED STATES PATENT OFFICE.

GIUSEPPE FACCIOLI, OF SCHENECTADY, NEW YORK, ASSIGNOR TO GENERAL ELECTRIC COMPANY, A CORPORATION OF NEW YORK.

VARIABLE-FREQUENCY GENERATOR.

949,320.　　　Specification of Letters Patent.　　Patented Feb. 15, 1910.

Application filed May 7, 1908. Serial No. 431,358.

*To all whom it may concern:*

Be it known that I, GIUSEPPE FACCIOLI, a subject of the King of Italy, residing at Schenectady, county of Schenectady, State of New York, have invented certain new and useful Improvements in Variable-Frequency Generators, of which the following is a specification.

My invention relates to alternating-current generators, and its object is to provide a self-exciting alternating-current generator capable of delivering current at frequencies which may be varied over a wide range. Such a generator finds a useful application in supplying current to induction motors for driving cars, locomotives, or other mechanism which are to be driven at variable speeds.

A self-exciting alternating-current generator has been proposed heretofore, in a Patent No. 933,399, issued to William Stanley, September 7, 1909, said machine comprising stator and rotor windings, the latter provided with a commutator, and the two windings connected to each other and to the load-circuit. Such a machine is self-exciting, the exciting-current flowing through stator and rotor windings in series, and the load-current flowing from both stator and rotor windings to the load-circuit. Furthermore, the frequency of such a machine does not depend entirely upon the number of poles and the speed of rotation, but depends also on the ratio of stator to rotor turns, and is equal to the frequency of rotation (that is, the number of pairs of poles times the revolutions per second) multiplied by the number of rotor turns and divided by the sum of the stator and rotor turns. Thus, if stator and rotor have the same number of turns, the frequency of the current delivered is one-half the frequency of rotation.

My invention consists in adapting a machine of this type for delivering currents, the frequency of which may be varied over wide ranges. I accomplish this by connecting the stator and rotor windings to each other through a variable voltage transformer, instead of directly. With the connection thus made, the frequency of the currents delivered is equal to the frequency of rotation multiplied by the secondary turns of the transformer, and divided by the sum of the secondary and primary turns of the transformer; those transformer turns which are connected to the rotor terminals being called, for convenience, the "primary" turns, and those connected to the stator terminals being called the "secondary" turns. By varying the ratio of transformation of the transformer, the ratio of the secondary turns to the sum of the secondary and primary turns is varied, and consequently the frequency of the currents generated in the machine may be varied over wide ranges.

My invention will best be understood by reference to the accompanying drawings, in which—

Figure 1 shows diagrammatically a variable-frequency self-exciting alternating-current generator arranged in accordance with my invention, and Figs. 2 to 4 are modifications of the same.

In Fig. 1, A represents the stator winding, and B the rotor winding, which latter is provided with a commutator and two sets of commutator brushes $b\ b$ and $b'\ b'$. The arrangement of brushes indicated is that for a bipolar two-phase generator. The stator winding is provided with two sets of terminals, $a\ a$ and $a'\ a'$, corresponding in position to the two sets of rotor brushes. The rotor brushes $b\ b$ and the stator terminals $a\ a$ are connected together through a variable-ratio transformer C. The stator and rotor terminals for the other phases are similarly connected through a variable-ratio transformer C'. The lines D D represent one phase of the load-circuit, and the lines D' D', the other phase.

A machine arranged as shown in Fig. 1 has a revolving field, the speed of which determines the frequency generated in the machine, and also the ratio of the voltages induced by it in the rotor and stator, respectively. Consequently, a given generated frequency corresponds to a certain ratio of induced voltage in stator and rotor. Now, since the ratio of the terminal-voltages of stator and rotor can be varied by varying the ratio of transformation of the transformers C and C', it follows that this variation of the ratio of transformation varies the frequency of the currents generated in the machine. For instance, suppose the ratio of the transformer turns connected to the rotor to the number of transformer turns connected to the stator is decreased; this means that the terminal-voltage of the rotor is decreased with respect to the stator, and, therefore, the speed at which the field-flux revolves must increase, so as to cut the stator turns faster, and the rotor turns at a lower rate. In other words, the frequency of the machine is increased.

In place of a transformer having two distinct windings, a single-winding transformer, or auto-transformer, may be employed. Furthermore, the frequency may be controlled by varying the number of transformer turns connected to the stator of the machine, instead of those connected to the rotor. Such an arrangement is shown in Fig. 2, in which the transformer C has a single winding, and in which the number of transformer-turns connected to the stator winding are varied. In Fig. 2, the connections of the other phase are omitted, for the sake of simplicity, since they are identical with those shown for the first phase. Another difference between Figs. 1 and 2 is the points at which the load-circuit D D is connected to the machine. In Fig. 1, the load-circuit is connected to the transformer-leads connected to the stator winding, while in Fig. 2 the load-circuit is connected to the transformer-leads connected to the rotor. This change affects the regulation of the machine. The arrangement of Fig. 1 gives poorer regulation at low power-factor than the arrangement of Fig. 2.

Instead of connecting the load-circuit to either winding of the generator directly, it may be connected to the machine inductively, as shown in Fig. 3. In this figure, the transformer C has a secondary winding to which the load-circuit is connected, in addition to the two windings shown in Fig. 1. Thus the frequency - regulating transformer may have either one, two or three windings.

By properly connecting the load-circuit, it is possible to compound the machine, so as to give a constant voltage, or rising voltage, with increase of load. Such an arrangement is shown in Fig. 4, in which the load-circuit D D is connected to points $a^2$ on the stator winding in advance of the points $a$ to which the secondary winding of transformer C is connected; the direction of rotation of the rotor being indicated by the arrow. With this arrangement the current flowing from the rotor to the load-circuit flows through a portion of the stator winding and produces a compounding effect. The amount of compounding depends upon the displacement between the stator terminals $a$ and $a^2$.

Many other connections of the machine windings, the variable-ratio transformer, and the load-circuit will be obvious to those skilled in the art. Furthermore, auxiliary regulating devices may be employed in combination with the variable-ratio transformer, if desired. Accordingly, I do not desire to limit myself to the particular connections shown, but aim in the appended claims to cover all modifications which are within the scope of my invention.

What I claim as new and desire to secure by Letters Patent of the United States, is:

1. A variable-frequency self-exciting alternating-current generator, having stator and rotor windings, one of said windings being provided with a commutator and brushes, said windings being connected to each other and to the load-circuit, and a variable-ratio transformer included in the connections between said windings.

2. A variable-frequency self-exciting alternating-current generator, having stator and rotor windings, one of said windings being provided with a commutator and brushes, a variable-ratio transformer through which said windings are connected to each other, and a load-circuit supplied with current from said generator.

3. A variable-frequency self-exciting alternating-current generator having stator and rotor windings, one of said windings being provided with a commutator and brushes, a transformer having primary and secondary leads connected to the rotor and stator windings respectively, means for varying the ratio of transformation of said transformer, and a load-circuit supplied with current from said generator.

4. A variable-frequency self-exciting alternating current generator having stator and rotor windings, one of said windings being provided with a commutator and brushes, a transformer having primary and secondary leads connected to the rotor and stator windings respectively, means for varying the ratio of transformation of said transformer, and a load-circuit connected to points on the stator winding displaced from the points on said winding to which the transformer leads are connected.

In witness whereof, I have hereunto set my hand this 6th day of May, 1908.

GIUSEPPE FACCIOLI.

Witnesses:
BENJAMIN B. HULL,
HELEN ORFORD.